United States Patent
Bourdelles et al.

(10) Patent No.: US 9,392,482 B2
(45) Date of Patent: Jul. 12, 2016

(54) METHOD FOR OPTIMIZING THE CAPABILITIES OF AN AD HOC TELECOMMUNICATION NETWORK

(75) Inventors: Michel Bourdelles, Gennevilliers (FR); Stéphane Pega, Gennevilliers (FR)

(73) Assignee: THALES, Courbevoie (FR)

( * ) Notice: Subject to any disclaimer, the term of this patent is extended or adjusted under 35 U.S.C. 154(b) by 275 days.

(21) Appl. No.: 14/110,421

(22) PCT Filed: Apr. 10, 2012

(86) PCT No.: PCT/EP2012/056406
§ 371 (c)(1),
(2), (4) Date: Feb. 17, 2014

(87) PCT Pub. No.: WO2012/136840
PCT Pub. Date: Oct. 11, 2012

(65) Prior Publication Data
US 2014/0293787 A1   Oct. 2, 2014

(30) Foreign Application Priority Data

Apr. 8, 2011   (FR) ...................................... 11 01090

(51) Int. Cl.
| | |
|---|---|
| H04J 1/16 | (2006.01) |
| H04W 28/02 | (2009.01) |
| H04W 40/24 | (2009.01) |
| H04W 40/02 | (2009.01) |
| H04B 7/155 | (2006.01) |
| H04L 12/721 | (2013.01) |
| H04W 84/18 | (2009.01) |

(52) U.S. Cl.
CPC ............ *H04W 28/021* (2013.01); *H04W 40/02* (2013.01); *H04W 40/248* (2013.01); *H04B 7/15521* (2013.01); *H04L 45/12* (2013.01); *H04L 45/38* (2013.01); *H04W 84/18* (2013.01)

(58) Field of Classification Search
CPC ... H04W 28/021; H04W 40/02; H04W 84/18; H04L 45/12; H04L 45/38
See application file for complete search history.

(56) References Cited

U.S. PATENT DOCUMENTS

| | | | | |
|---|---|---|---|---|
| 2002/0122410 | A1* | 9/2002 | Kulikov ................ | H04L 45/302 370/349 |
| 2008/0170518 | A1* | 7/2008 | Duggi ..................... | H04L 45/18 370/310 |
| 2015/0249587 | A1* | 9/2015 | Kozat ..................... | H04L 43/10 370/222 |

FOREIGN PATENT DOCUMENTS

EP   2141865 A1   1/2010

OTHER PUBLICATIONS

E. W. Dijkstra, "A Note on Two Problems in Connexion with Graphs", Numerische Mathematik 1, 1959, pp. 269-271.

(Continued)

*Primary Examiner* — Kan Yuen
(74) *Attorney, Agent, or Firm* — Baker & Hostetler LLP (57) ABSTRACT

A method is provided for optimizing the adaptation of communication routes in a network consisting of wireless communication nodes, with transfer of information between nodes by relays. This optimization notably enables the communications capabilities to be increased within a self-organized MANET-type network ("Mobile Ad Hoc Network") which is present notably in radio networks.

10 Claims, 11 Drawing Sheets

(56) References Cited

OTHER PUBLICATIONS

Kano S et al., "Route Switching Protocol for Network Coding in Ad Hoc Networks", Communications and Electronics (ICCE), 2010, Third International Conference on, Aug. 11, 2010, pp. 55-60, IEEE, Piscataway, NJ, USA.

Song Han et al., "Coding-Aware Multi-path Routing in Multi-Hop Wireless Networks", Performance, Computing and Communications Conference, IEE International, Dec. 7, 2008, pp. 93-100, IEEE, Piscataway, NJ, USA.

Xin Wei et al., "Network Coding Aware Routing Protocol for Lossy Wirless Networks", Wireless Communications, Networking and Mobile Computing, 2009. WICOM '09. 5th International Conference on, Sep. 24, 2009, pp. 1-4, IEEE, Piscataway, NJ, USA.

Katti S et al., "XORs in the Air: Practical Wireless Network Coding", IEEE/ACM Transactions on Networking, Jun. 1, 2008, pp. 497-510, vol. 14, No. 3, IEEE/ACM, New York, NY, US.

Royer E M et al., "A Review of Current Routing Protocols for Ad Hoc Mobile Wireless Networks", IEEE Personal Communications, Apr. 1, 1999, pp. 46-55, vol. 6, No. 2, IEEE Communications Society, US.

* cited by examiner

METHOD FOR OPTIMIZING THE CAPABILITIES OF AN AD HOC TELECOMMUNICATION NETWORK

CROSS-REFERENCE TO RELATED APPLICATIONS

This application is a National Stage of International patent application PCT/EP2012/056406, filed on Apr. 10, 2012, which claims priority to foreign French patent application No. FR 1101090, filed on Apr. 8, 2011, the disclosures of which are incorporated by reference in their entirety.

FIELD OF THE INVENTION

The invention relates to a method for optimizing the adaptation of communication routes in a telecommunications network consisting of wireless communication nodes, with transfer of information between nodes by relays. This optimization notably enables the communications capabilities to be increased within a self-organized MANET-type network ("Mobile Ad Hoc Network") which is present notably in radio networks. It involves data rate optimization by reduction of the number of stream packets sent, without any increase in the data size of these packets.

It can be used, for example, for optimizing the capabilities of an ad hoc communications network by factorization of packets to be transmitted, through knowledge of the neighborhood topology of a network. The proposed method makes it possible to identify route modifications for existing flows to be applied in order to perform optimizations by network coding. It can also be used for networks having a mobile node infrastructure.

BACKGROUND

The technical problem posed in the present invention is the problem encountered in the use/adaptation of the network coding in ad hoc network topologies, on multi-flows with a routing modification for existing flows, these flows establishing themselves in a temporally synchronized or non-synchronized manner.

One way of proceeding is to use the "network coding" method. The benefit of network coding, to with relaying a linear combination of received packets instead of relaying the packets separately, is explained in FIGS. 1 and 2.

Figure 1:
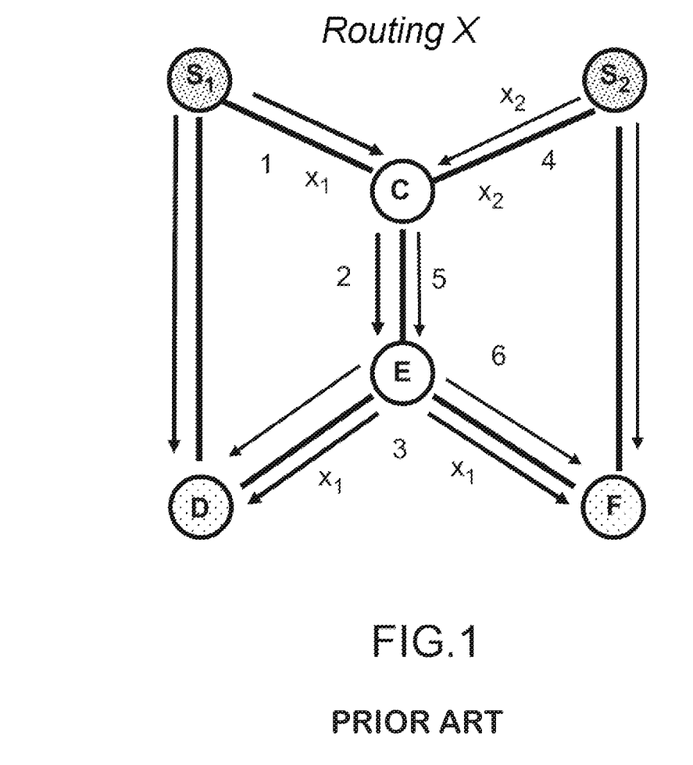
FIG. 1 shows an example of routing according to the prior art and FIG. 2 shows an example of implementation of network coding according to the prior art.
Figure 2:
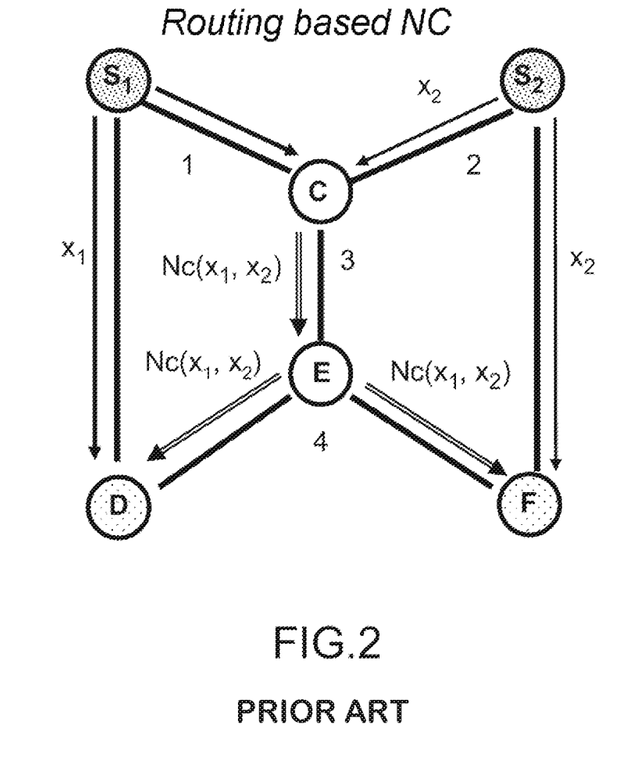

FIG. 1 presents an example of routing without use of optimization by network coding in the same butterfly topology as that of FIG. 2. In this example it can be seen that the flow $X_1$ transits by means of the transmissions of tagged packets 1, 2, 3, and that the flow $X_2$ transits by means of the transmissions of tagged packets 4, 5, 6. This leads to a total number of 6 transmissions to transmit a packet from the two flows and a heavy use of resources on the nodes C and E which transmit the packets from the 2 flows.

The example given in FIG. 2 makes it possible, by transmitting the combination of a flow $X_1$ and of a flow $X_2$ transmitted respectively by two different sources, to reduce the number of packets to be relayed.

In this example, the source nodes $S_1$ and $S_2$ communicate data to the destination nodes D and F, either directly for the communication from $S_1$ to D and $S_2$ to F, or using the links C and E as relays for the communications from $S_1$ to F and $S_2$ to D. The general principle of network coding consists in linearly combining the stream packets relayed by C and E, in order to reduce the communication data rate on these nodes.

The linear combination proposed in the example in FIG. 2 is achieved by application of the bitwise XOR binary function, leading to $Nc(X_1, X_2)$, and thus without increasing the size of the packets transmitted, knowing that each of the nodes D and F have already received the data directly, from the flows $X_1$ and $X_2$ respectively. These nodes will therefore be able to extract the information from these flows $X_1$ and $X_2$ respectively. In this figure it will be seen that that there are only four instances of sending 1, 2, 3 and 4. The communication is achieved by broadcast. Sending the same packet to several neighbors has the same data rate cost as sending to a single neighbor.

It will be noted that, in relation to optimal routing without the use of optimization by network coding in this particular topology presented in FIG. 1, the use of network coding on the same topology presented in FIG. 2 leads to a data rate gain of 33%. This leads to an increase in consumption and optimization of resource allocation (nodes C and E).

One of the aims of the method according to the invention is to propose a protocol which makes it possible to determine the best routes for transmissions of data flows in various topological situations in a communications network.

Patent application EP 2 141 865 discloses a method making it possible to combine routing with network coding. When a flow is established, the method consists in counting the number of links shared with other flows by enriching the route request information RREQ with reactive routing. In this document, there is no modification of the route for existing flows, the route being determined flow by flow, without any overall view of all flows.

Before giving some examples which will improve understanding of the invention, a few useful definitions for the description are listed below:

a node (or radio terminal) is one of the basic components of the network. A node has the capability to detect its network neighborhood (i.e. all of the nodes in the network with which it can send and receive information without relay nodes) by means of appropriate signalling known to those skilled in the art. This node provides a radio resource allocation capability making it possible to transmit stream flows to neighbor nodes; a node has the capability to receive data packets from these neighbor nodes, to decode them and store information, to perform algorithmic processing and to transmit packets to its neighbor nodes, with a possibility of selecting a set of its neighbors for data transmission. The connecting links between two nodes are considered bidirectional (the nodes are aware of each other and have allocated some of the resource in such a way as to establish streams and exchange messages in both directions of the connection);

a node is said to be a "source node" if it sends a data flow; as will be described in the rest of the description of the method, this concept of source node can be extended to nodes with a stable link to the source node, and may also be extended to nodes sending a receiver for a flow;

a node is said to be a destination node when it is the destination of one or more flows; as will be described in the rest of the description, this concept of destination node is extended to transit nodes or destination nodes for data flows with a stable link to the destination node or nodes for which it relays the flow. In this case, the real destination node may be the destination of a single flow. The extension of the destination node also applies to nodes sending a receiver for a flow;

the concept of stability is understood in terms of stability of the communication link during the execution of the data flow or flows, an expression known to those skilled in the art;

a transit node or intermediate node is equipped with means for receiving and sending data flows;

a "pivot" node is a transit node identified as having the capability to code the flows it receives by network coding and to send this coded flow;

a preceding node is a node that is situated upstream of the node in question, when travelling along a path leading to an origin node for a stream;

the word stream denotes a data transfer made between two nodes in the network; the stream occurs through transmission of data packets between the nodes;

the stream is established through prior establishment of a route composed of a series of communication nodes. The first element is the source node, other nodes—including the last—are the destination nodes, and the other nodes are relay nodes. Each of the nodes has the capability to communicate directly with the adjacent nodes in the series;

a routing protocol is a protocol which makes it possible to determine a route and to configure each of the nodes in such a way as to relay the stream packets. The setup of such a protocol is not considered a prerequisite for the use of the invention for setting up communication, but may be used in phase 1 of the invention, for which similar traversals are made, notably for the AODV (Ad hoc On-demand Distance Vector) protocol;

the words flow or flux are synonyms for stream here. It is possible to associate a separate identifier Id with each flow (for example from the identifier of the source node that initiates the flow);

an ad hoc network is an expression known to those skilled in the art that denotes a network in which the nodes self-organize and establish communication flow routes, for example by using a routing protocol;

the term "table" signifies a set of elements. These elements may be flow identifiers, numbers indicating a distance from one node to a source node or destination node or else an intermediate node;

an coded flow is generated by a coding function. It is possible, when coding 2 flows, to use the XOR function;

the value NN for a flow, relating to a node of the network, is the number of nodes on a path or a route that links the source node for the flow to this node;

each intermediate node updates a flow table which comprises all the active flows that transit through this node. The incoming flow contains an entry for each active flow containing the information (identifier for the flow, preceding hop, next hop, number of flows etc.);

the nodes have the possibility of storing the last two packets received from the flows that transit via these nodes;

the nodes have the possibility of storing a number of messages Mtopo (defined in the rest of the description), for a specifiable time period. This capability is mandatory on the initial stream nodes and optional on the relay nodes;

the nodes have the capability to receive stream establishment requests, linked to a flow, with directives regarding the path on which the flow is to be established, and also regarding the establishment of network coding for some of the nodes on the path. These messages MflowEstab are defined further on in the description;

a data packet header gives a separate identifier to the flow and to the packet of the flow.

SUMMARY OF THE INVENTION

The method according to the invention transfers the information for making decisions about network coding and rerouting of existing flows to origin nodes for these streams, allowing the application of network coding, for example of Networkcoding type, by way of illustration and in by no means limiting fashion.

The principle implemented consists notably in mixing the network coding and ad hoc network routing approaches in order to adapt the choice of routing according to the potential for gains by using network coding, by identifying topological situations where it can be used.

The invention relates to a method for optimizing the adaptation of communication routes in a wireless network consisting of communication nodes, said network comprising several nodes Ni, the transmission of stream data being carried out in the form of flows Xi and between at least two source nodes Ns and at least two destination nodes Nd, having at least the following steps:

step 1, a step of broadcasting a first message M from a source node Si, Ns to all the other nodes Ni of the network, in order to discover several paths Ci or routes capable of being used, on receipt of the message M a node Ni of the network stores, for each of the flows Xi that it receives, the distance NN of the node Ni in relation to the source node Ns or to the preceding node sending said flow Xi, in order to generate a table Tf for each path traversal Ci initiated by the source node Ns for each flow Xi coming from its neighbor nodes, the distance to the source node and the identifier Id of the neighbor node, step 2, each destination node Nd for flows Xi transmits messages to each of the neighbor nodes that are candidates to be a relay for several flows Xi, said messages containing information obtained by making use of the information in the table for storing the information collected in step 1, step 3, each of the nodes Ni receiving the flows Xi transmits to the neighbor nodes said information contained in a message Mtopo, said information being transmitted by mutual agreement by identifying the paths Ci on which network coding will be able to be applied, a node identifies itself as a pivot node if it receives from at least two different neighbor nodes at least two shared flows, list Lf, and if it sends on separate paths, and on receipt of the second message said node transmits to the nodes associated with the flows in Tf a message Mp informing that a node E is a pivot node Np, said pivot node transmitting its identifier Idp to the other nodes using a routing protocol, step 4, the identifiers corresponding to the nodes that have identified themselves as pivot nodes are transmitted to the source nodes Ns, which will alert the destination nodes using the routing protocol, then the source nodes Ns take the decision to make a change of flows or of streams and to propose to one or more pivot nodes that they use network coding for at least two flows in order to generate a single flow for the transmission to a destination node.

A message Mtopo contains, for example, at least the following elements:

a list Lf of flows;

a list Lp of lists of flows that can be optimized by network coding;

a list LBidir of the bidirectional flows from Lp;

a list FirstCod of the first node to which network coding should be applied;
a list Nd of lists of destination nodes;
a list Ln of the nodes traversed, making it possible to code trees with tags indicating the start of a tree and the end of the path of the tree;
a list Ltf of the flows entirely traversed in paths of the tree Ln;
collected information making it possible to determine the choice of routes.

The collected information contains, for example, at least the following elements:
the path distances Ld
paths Ldp that can be coded by network coding.

In the case of a bidirectional transmission of information, said method has, for example, a step involving storage of the packets transmitted for coding and decoding on the relay nodes.

In a variant embodiment, the method has phases of storage, coding and decoding of stream packets on a network topology of bidirectional flows between 2 nodes of the network, during the setup of communications with optimization by network coding.

A source node or initial node $S_2$ for the flow $X_2$ can delegate its capability to annotate the list Lft of the flows crossed to another node.

A final or destination node F delegates, for example, to another node $F_1$, from which several flows can transit, its capability to transmit messages.

The method has, for example, the possibility of choosing between several pivot paths by using a deterministic choice or by taking advantage of an opportunity in 2 pivot paths in order to transfer two flows.

A source node transmits resource allocation optimization directives to each of the nodes in the network.

The invention also relates to a network architecture making it possible to optimize the adaptation of communication routes in a network consisting of wireless communication nodes, said network implementing a routing algorithm, said network comprising several nodes Ni, the transmission of data being carried out between at least two source nodes Ns and at least two destination nodes Nd, said nodes Ns, Nd, Ni having access to means for sending and receiving and means for processing the information implementing the steps of the method described above.

BRIEF DESCRIPTION OF THE DRAWINGS

Other features and advantages of the device according to the invention will appear more clearly upon reading the following description of an embodiment, given by way of illustration and in no way limiting, with appended figures, in which.

DETAILED DESCRIPTION

In order to improve understanding of the principle implemented by the method and the system according to the invention, the following description is given in a non-limiting context with two source nodes and two destination nodes.

Figure 3:
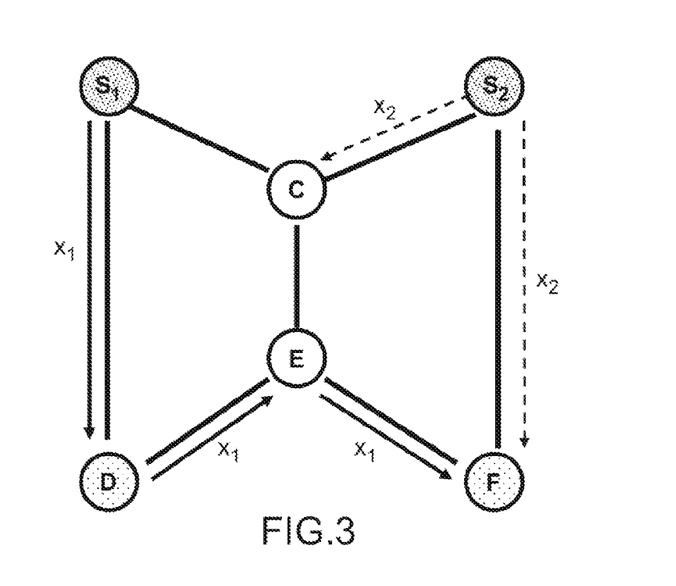
FIG. 3 presents a network having the same connection topology as that in FIG. 1, in which the flow $X_1$ is established with a route (S1-D-E-F) without different network coding but with the same cost as the tree of routes in FIG. 1 (S1-C-E; E-D; E-F) from the node $S_1$ to the destination nodes D and F, the node $S_2$ wishing to establish a flow $X_2$ to the destination nodes D and F.

FIG. 3 is a first representation of an ad hoc network in which a first established flow X1, shown in solid lines, which circulates from a first source node $S_1$ to a destination node D, then goes to a second destination node F via an intermediate node E.

The problem that occurs is that of optimizing the choice of routes when there is another flow request shown in FIG. 3 by a second flow $X_2$ in dashed lines, initiated by a second source node $S_2$ to the destination nodes D and F, in order to obtain the optimized situation in FIG. 2.

It is known that a node has:
a) on the one hand, information and protocols known to those skilled in the art for the nodes in this type of network:
　a separate identifier Id (typically the MAC or IP (Internet Protocol) address of the network, which are known to those skilled in the art)
　a transmission means E, a reception means R to a set of identified single-hop neighbors, the invention being based on topologies with links between neighbors making it possible to receive and send messages (bidirectional links).
　a knowledge by signaling protocol of the single-hop neighbor nodes, and the maintenance of the connection to the latter with a capability to set up data transmission sessions (communication of a data flow) on these neighbors, as well as sending of signaling messages, among which the messages Mtopo and MflowEstab defined by the invention. These capabilities are typical of a protocol stack for an ad hoc network known to those skilled in the art.
b) on the other hand, additional information specific to the use of the method according to the invention:
　Tf: a table which associates a number and a list of network node identifiers with flow identifiers,
　storage of the messages Mtopo in a limited storage space,
　storage of the last 2 packets received from flows, in the case of the invention being applied to topologies with bidirectional flows.

A destination node Nd has means for decoding the coded flows it receives, as well as the pivot nodes of so-called bidirectional flows.

An intermediate node, when it will be denoted pivot node, will have means for coding the information.

Figure 4:
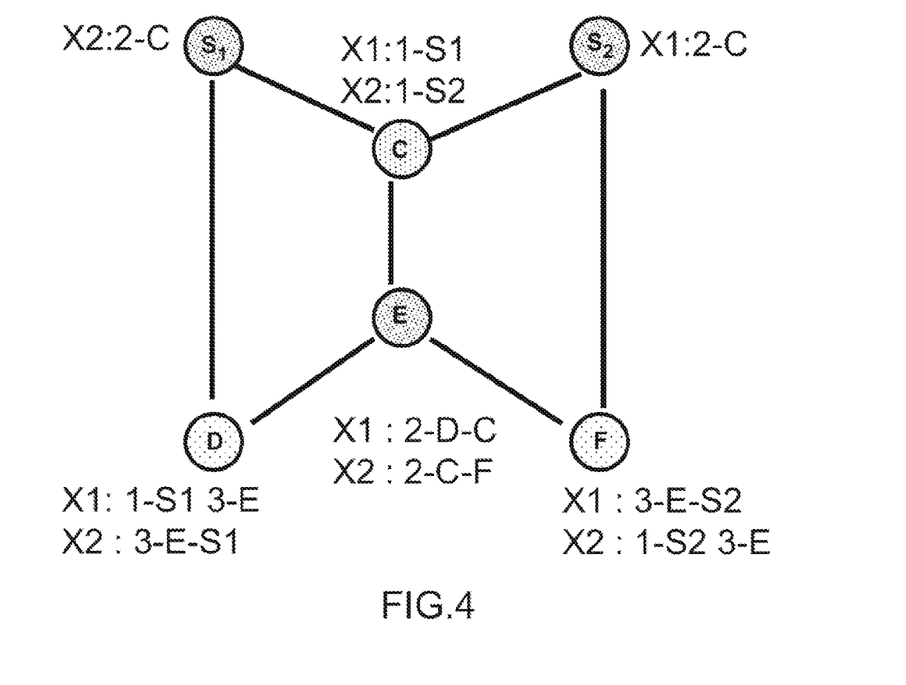
FIG. 4 shows a representation of the first step according to the invention.

Step 1—Detection of the Distance of an Origin Node in a Broadcast-Type Traversal—FIG. 4

FIG. 4 shows the implementation of the first step of the method according to the invention by considering two established flows $X_1$ and $X_2$. In the first step, the source nodes broadcast the flows to all the nodes in the network using the flooding technique, for example. In order to do this it is possible to use a Dijkstra-type algorithm [described by way of example in the article Numerische Mathematik 1, 269-271-1959<<A note on two problems in connexion with graphs>> by E. W. Dijkstra, published] which can be limited to a number expressed by a number of "hops" via relay nodes. The technique of routing by flooding is based on a simple principle consisting in each node retransmitting the received packet on all the exit paths from the node, except for the arrival path. This step is also performed by the routing protocols (notably AODV) during the search for a route. In this first step each node Ni will store in a table Tf, for each path traversal Ci initiated by the source node Ns for each flow Xi coming from its neighbor nodes, the distance NN of the node Ni in relation to the source node and the identifier Id of the neighbor node as well as all the destination nodes for the flow. For a flow, for a given neighbor, the shortest distance value will be, for example, stored.

An optional timeout value TTL (time to live) can be transmitted in the traversal by flooding the flows, to delete the information after a timeout of TTL time units.

In this example shown in FIG. 4, the part of the network comprises a first source node $S_1$ for the flow $X_1$, and a second source node $S_2$ for the flow $X_2$ and a first destination node D and a second destination node F for the two flows $X_1$ and $X_2$.

In FIG. 4, by applying the traversal by flooding starting from the origin nodes $S_1$ and $S_2$ for the flows $X_1$ and $X_2$ (for the nodes $S_1$ and D) we obtain:

Node $S_1$: Flow $X_2$ 2-C means that the node $S_1$ is at a distance of 2 hops from the source node for the Flow $X_2$, and that the neighbor node enabling access to the initial node for this flow is node C. Node D; Flow $X_1$ 1-$S_1$, 3 E means that it is one hop from the source node $S_1$ via $S_1$ and 3 hops via the neighbor node E and Flow $X_2$ 3-E-$S_1$ 3 hops from the origin node for the Flow $X_2$ via $S_1$ and via E.

The storage of this information (identifier of a node, distance from this node to the source node for a given flow), can be limited to storage of distances less than a limit by configuration of the flooding algorithm; in FIG. 4, this value is 3. This configuration can depend on the characteristics of the flow in terms of compliance with Quality of Service constraints. This information is stored and kept with a given timeout in keeping with the execution time of the flow.

Figure 5:
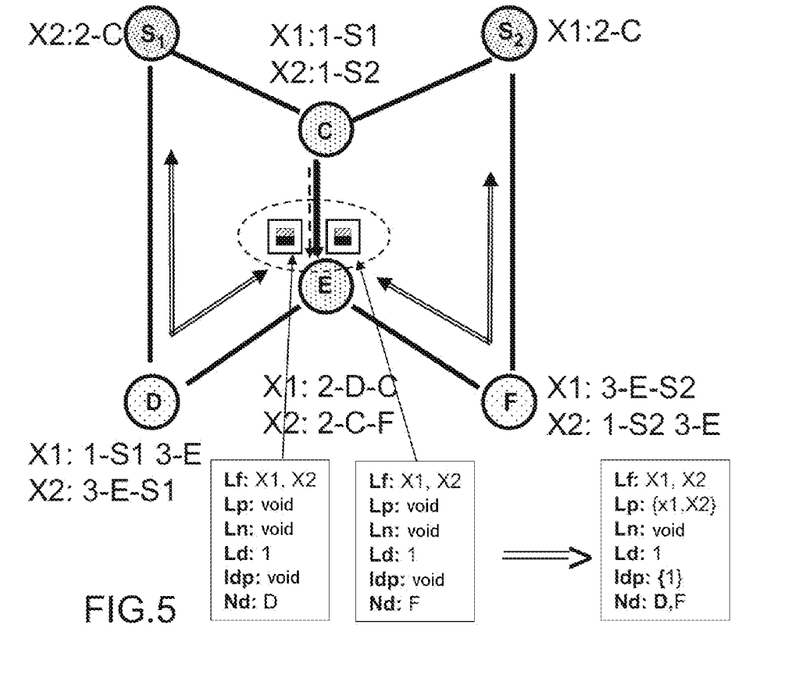
FIG. 5 shows a representation of the second step of the method.
Figure 6:
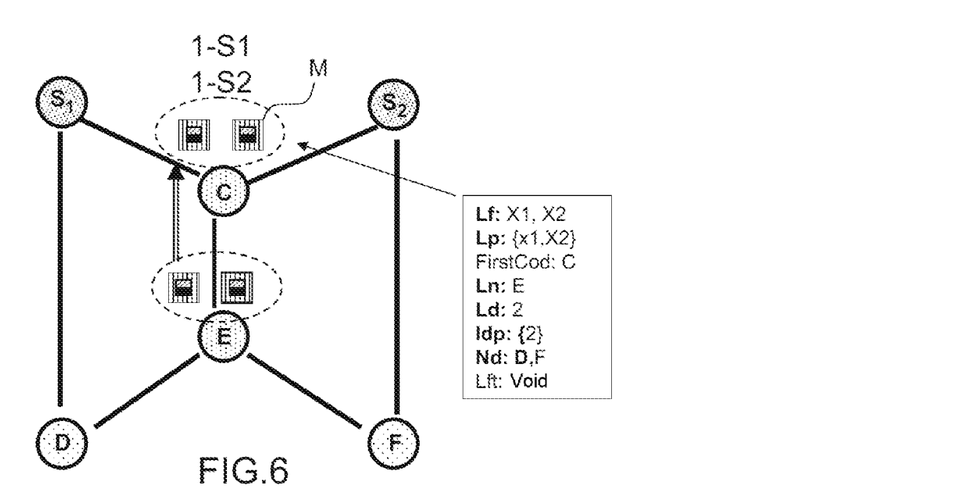
FIG. 6 shows a representation of the third step of the method.
Figure 7:
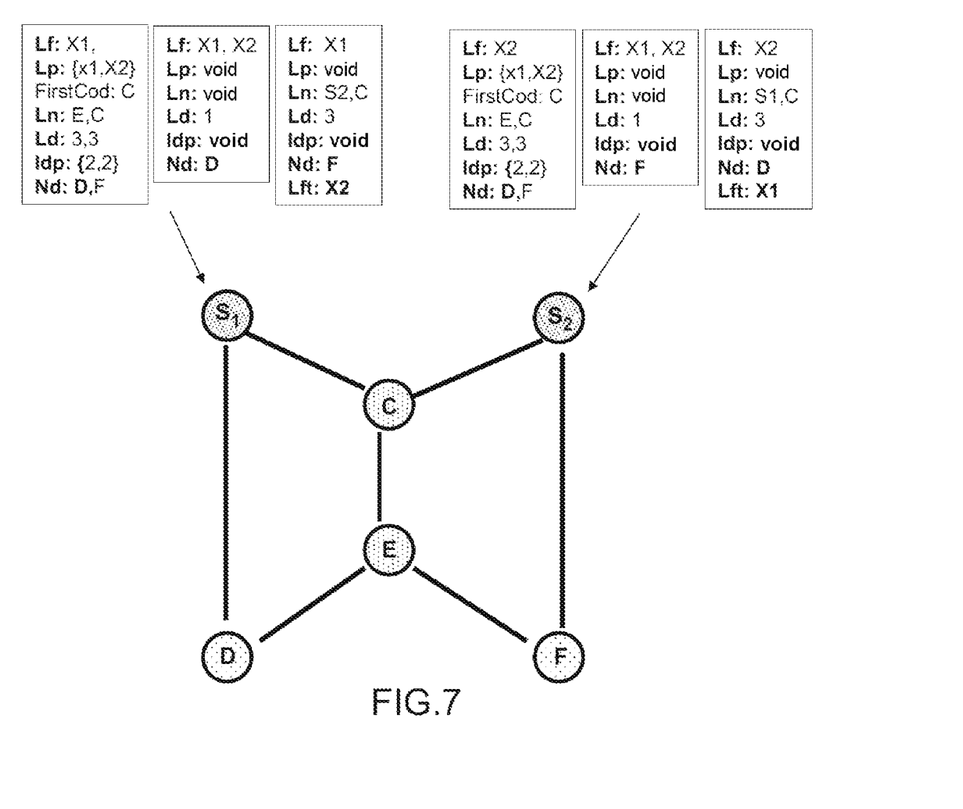
FIG. 7 shows a representation of the fourth step of the method.

Step 2 (FIGS. 5, 6 and 7)

The aim of this step is to detect or identify the nodes which will potentially be able to act as relays for n flows (in the example n=2) on m destination nodes (in the example m=2).

Each destination node for flows will, periodically or by user request, transmit messages Mtopo to each of the neighbors that are candidates to be relay nodes for several flows. These messages contain the flows that are able to transit through nodes. This information is obtained by making use of the information from the storage table Tf for the information collected in the preceding step. These messages are transferred to the other neighbor nodes present that are marked as preceding nodes for the flows, the nodes being identified by their unique identifier.

These messages contain, for example, the following information:
- a list Lf of flows;
- a list Lp of lists of flows that can be optimized by network coding;
- a list Lbidir of bidirectionality values for the flows (false if the flows are not bidirectional, true if they are bidirectional) from the list Lp;
- a list of first nodes FirstCod to which the network coding from the list Lp applies;
- a list Nd of lists of destination nodes;
- a list Ln of the nodes traversed, this list making it possible to code trees with tags indicating the start of a tree and the end of the path of the tree;
- a list Ltf of the flows traversed, flows from the terminal node to the origin node in the path.

Collected elements enabling the source nodes to choose the best paths. The collected elements here are the distances of the paths Ld and of the paths Ldp that can be coded by network coding. The latter can be enriched or replaced by other criteria (Quality of Service information known to those skilled in the art, for example),
- a list Ld of distances for the path of the flows from Lf,
- the distances Ldp for paths with coding by sets of the paths from Ln for the flows listed in the list of the flows Lp that can be optimized by network coding.

In the case of a protocol implementing synchronization, the node E can wait for all the packets from the flows it has received before returning all the flows to the preceding node at the same time. For example, in FIG. 5, the node E receives a message from D and a message from F.

For example,

E, $S_1$ receive from D two messages, a first message from D and a second message from F respectively:

E, $S_1$ receive from D:
Lf: $X_1$, $X_2$
Lp: void
Ln: void
firstCod: void
Ld: 1
Ldp: void
Nd: D
Lft: void E, $S_2$ receive from F:
Lf: $X_1$, $X_2$
Lp: void
Ln: void
firstCod: void
Ld: void
Ldp: void
dp: void
Nd: F
Lft: void In the case of a protocol not implementing a synchronization mechanism for the broadcast of the various flows, the node receiving information can transmit them as they arrive.

Storing this information makes it possible to transmit concatenated information. E deduces that it can be pivot node because:
- it receives from two different neighbors at least 2 shared flows (list Lf),
- it sends coded flows on separate paths (no shared path nodes).

On receipt of the second received message, the node E transmits to the nodes associated with the flows in Tf (node C in the example) a message Mp with the information that E is pivot node Np. For the neighbor nodes not yet traversed for the signaling return, if they are identified by the first initial step as preceding nodes for these flows, they are determined to be pivot nodes (Ld value incremented, number of nodes on the path for the flows from Lf with network coding) in the message transmitted via the node E to the node C.

FIGS. 6 and 7 schematically show the return of the information to the source nodes $S_1$, $S_2$.

A node is defined as pivot node if it receives from at least 2 different neighbors a message identifying it as being able to send several flows shared by these two neighbors. This information will be transmitted to all the nodes in the neighborhood.

In the example in FIG. 5, the node E, which receives information from the separate nodes D and F that it is able to send the two flows $X_2$ and $X_1$ on these nodes, is a pivot node Np for these two nodes. It is a node where either network coding of these flows can potentially be carried out, or a flow originating from the coding of these flows can be sent by this node.

Step 3 (FIG. 6)

The flow transmission messages received from a neighbor are transmitted to the other neighbors for which an association has been stored in the table Tf. A node that has been determined to be a flow pivot returns this information in the message in the field Lp to each node contained in the list of one of these flows in the table Tf. Each of the nodes No receiving the flows Xk will transmit to the neighbor nodes the information contained in the message Mtopo which is transmitted by mutual agreement by identifying the paths Ci on which network coding will potentially be able to be applied.

| C receives from E: | C receives from $S_1$: | C receives from $S_2$ |
| --- | --- | --- |
| Lf: $X_1$, $X_2$ | Lf: $X_1$, $X_2$ | Lf: $X_2$ | Lf: $X_1$ |
| Lp: void | Lp: {$X_1$, $X_2$} | Lp: void, | Lp: void, |
| FirstCod: void | FirstCod: C | FirstCod: void | FirstCod: void |
| Ld: 2 | Ld: 2 | Ld: 2 | Ld: 2 |
| Ldp: void | Ldp: 2 | Ldp: void | Ldp: void |
| Nd: D | Nd: D, F | Nd: D | Nd: F |
| Ln: E | Ln: E | Ln: $S_1$ | Ln: $S_2$ |
| Lft: void | Lft: void | Lft: $X_1$ | Lft: $X_2$ |

The second message transmitted from C via E results from the receipt of the two messages from D and F to E, which make it possible to determine at node E that it is pivot node for the streams $X_1$ and $X_2$.

| C transmits to $S_1$ | |
| --- | --- |
| Lf: $X_1$, | Lf: $X_1$ |
| Lp: {$X_1$, $X_2$} | Lp: void, |
| FirstCod: C | FirstCod: void |
| Ld: 3, | Ld: 3 |
| Ldp: 2 | Ldp: void |
| Nd: D, F | Nd: F |
| Ln: C, E | Ln: C, $S_2$ |
| Lft: void | Lft: $X_2$ |
| C transmits to $S_2$ | |
| Lf: $X_2$, | Lf: $X_2$ |
| Lp: {$X_1$, $X_2$} | Lp: void, |
| FirstCod: C | FirstCod: void |
| Ld: 2, | Ld: 3 |
| Ldp: 2 | Ld = void |
| Nd: D, F | Nd = D |
| Ln: C, E | Ln: C, $S_1$ |
| Lft: void | Lft: $X_1$ |

Step 4 (FIG. 7)

The identifiers corresponding to the nodes that have identified themselves as pivot nodes are returned to the source nodes Ns. These source nodes will alert the destination nodes of the receipt of this information using the routing protocol. Then the source nodes make the decision to effect a change of flows or of stream and to propose to one or more pivot nodes that they use network coding for at least two flows in order to generate a single flow for transmission to the destination node.

Thanks to the information received by $S_1$ and $S_2$, $S_1$ (and $S_2$) can determine that C, E may potentially be pivot nodes for the flow $X_1$ (when they are initiated by $S_1$) and the flow $X_2$ (when they are initiated by $S_2$), since D and F are shared destinations for $X_1$ and $X_2$ and there is a separate path for $S_1$ (and $S_2$) accessing one of the destination nodes D (and F).

The decision to carry out network coding will be able to be taken by taking into account, for example, the constraint required for the stream (latency, resource allocation capability, stability of the links in the network).

A coding decision can potentially be made from the moment that, at a node, in the case where 2 flows are being managed, there are a path $C_1$ for routing the flow with a potential for network coding by one flow and a path $C_2$ for routing the flow with transfer of the flow from the origin node separate from the route $C_2$.

The coding decision effective at the first pivot node will be made if the pivot node receives a request for coding via the two initial nodes. The initial nodes have reciprocal knowledge of a path C2, via the information from the lists Lft (of the flows traversed, flows from the terminal node to the origin node in the path).

Figure 8:
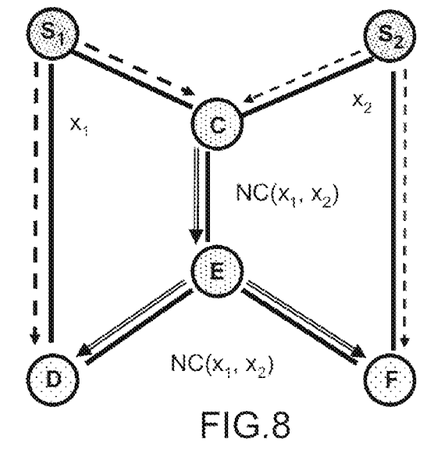
FIG. 8 shows a representation of the fifth step of the method.

Step 5 (FIG. 8)

The fifth step relates to the application of the network coding on a shared path and the decoding of the information at the destination nodes, which will have received firstly an initial uncoded flow and secondly a coded flow comprising a coding of the set of at least two flows; in our example this corresponds to the flows $X_1$ and $X_2$.

Establishment of the Complete Route $S_1$ (and $S_2$) transmit to the node C messages MFlowEstab containing:
- the identifier of the flow originating from the origin node, and any other parameters associated with this flow known to those skilled in the art that make it possible to initiate the stream of the flow;
- the information on whether or not to authorize network coding with the flows to be encoded Cod;
- the value of the first node used for the network coding FirstCod;
- a Boolean value ApplyCoding indicating if the network coding can be applied to the node that receives the message MFlowEstab,
- the information from the nodes of the tree about the routes to be initiated for routing, in order to access all the destination nodes. LRoute: C,E,D<tag>F, which codes the paths C,E,D and C,E,F, <tag> being an identifier that is not assigned to a node and acts as a cut-off value for the coding of a tree in a list.

On receiving the message, each of the nodes:
- internally allocates the resources making it possible to establish a stream with the node from which it receives the message, a procedure identical to the conventional establishment of a stream in an ad hoc network known to those skilled in the art.
- removes its identifier from LRoute, decrements and transmits the message to the following node or nodes in the tree of coded paths in LRoute.

If the identifier of the node FirstCod is the current node, or if the value ApplyCoding from the message MFlowEstab is at True, the latter stores this information in such a way as to code the packets of these 2 flows. It transmits the message MFlowEstab, assigning the value True to the field ApplyCoding.

If the initial nodes for the streams (here $S_1$ and $S_2$) authorize the stream and the access through destination nodes by the initial nodes allows network decoding at the destination nodes, $S_1$ (or $S_2$) transmits to the node D (or F) the flow establishment information $X_1$ (or $X_2$) with decoding with the information transmitted by the node E.

Application of the Streams with Network Coding and Decoding:

When the streams are established, for the nodes identified as first nodes on the path performing network coding between several flows, if the packets of a single flow are received, the latter are transmitted as they are. If the packets of several flows are received, the latter are transmitted coded by network coding; if one stream flow terminates, the packets of the other flow will be transmitted without coding. The receipt of 2 flows is understood to be the receipt of packets from 2 flows in a time period, making it possible to then transmit the coded message of the 2 streams without distorting the real-time constraints associated with these flows.

In the header of the data packet are indicated the identifier of the flow or flows, the identifiers of packets from the flows in the case where there are several flows, and the type of coding, when the latter is not known to the destination nodes. Nodes other than the nodes initiating coding relay the packets without modifying their content. The destination nodes decode the packets received from several paths.

Extension of the Definition of the Origin and Destination Nodes for Application to the Bidirectional Flows with Relay as Described in Relation to FIGS. 9 to 13.

Subsequently, $X_iP_j$ denotes the packet j from the data flow $X_i$. Memo $X_iP_j$ for a node NN denotes the storage of the packet j from the data flow $X_i$ in the node NN. Suppress $X_iP_j$ for a node NN denotes its deletion. Decode $X_iP_j$ denotes its decoding. $NC(X_iP_j, X_kP_l)$ denotes the network coding of the flow data packet j from the data flow $X_i$ with the flow data packet I from the data flow $X_k$. These definitions remain valid for FIGS. 13 and 14.

In these examples, the definition of the initial and final nodes is extended to the initial and final nodes of bidirectional flows, letter b in the figures; in this case the transmitted messages M incorporate the flows $X_1$ and $X_2$ into the list Lf.

Figure 9:
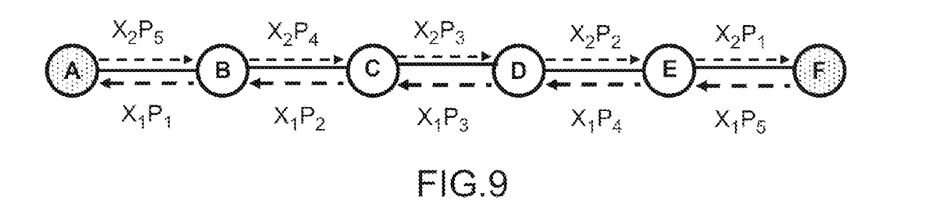
FIG. 9 presents a so-called bidirectional stream topology, with routing of the streams without network coding.
Figure 10:
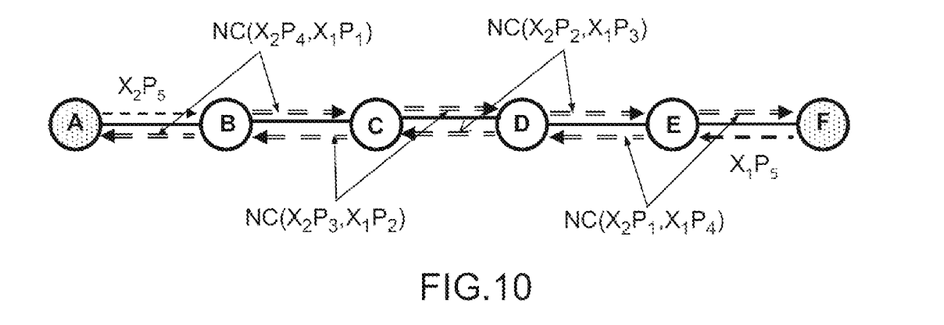
FIG. 10 presents the topology in FIG. 9, with application of the optimization by network coding.

In the example in FIG. 9, the nodes A and F are considered to be initial and final nodes; in this case the transmitted messages MTopo incorporate $X_1$ and $X_2$ into the list Lf. These packets are transmitted from A to F and from F to A. The relay nodes receiving packets from two separate nodes are pivot nodes for these two flows. These nodes exchanged from these 2 flows being bidirectional, the pivot nodes will code and decode the packets received as indicated in FIG. 10.

Figures 11, 11A:
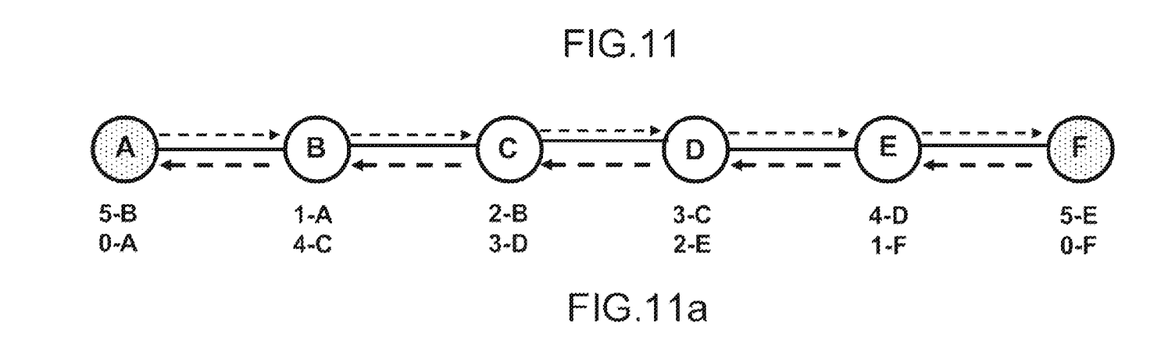
FIGS. 11a, 11b and 11c present the steps of the protocol in order to transmit to the origin nodes the information making it possible to decide if optimization by network coding is applicable, FIGS. 12, 13 and 14 describe the establishment of network coding with storage of data packets on the relay nodes in a bidirectional stream topology.
Figure 11B:
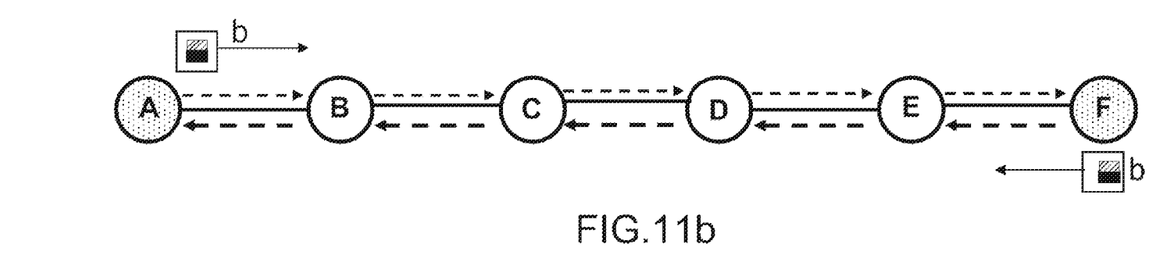
Figure 11C:
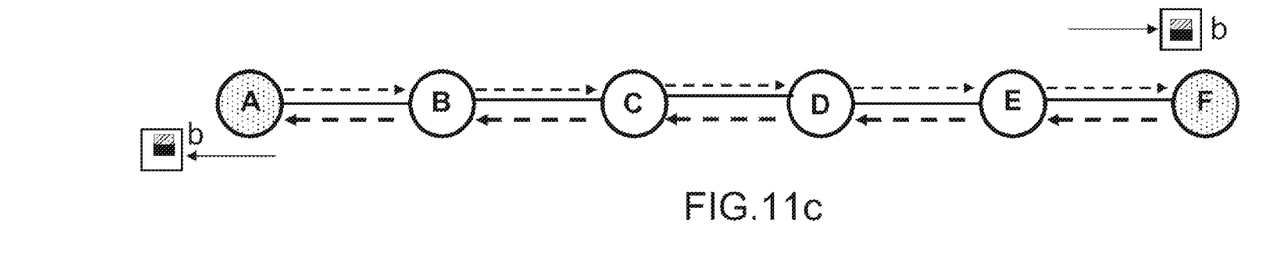

Phase 1 applied to this topology makes it possible to store the information on each of the nodes as presented in FIG. 11a. The initial nodes A and F transmit the messages MTopo, indicating that it is a bidirectional flow (field LBidir to True for the flows $\{X_1, X_2\}$ in Lp.) On receipt of the 2 messages from the 2 initial nodes the relay nodes allocate memory in order to store the 2 preceding packets from the 2 flows.

When 2 streams packets are stored for the 2 streams for the nodes FirstCod, messages MFlowEstab from the two flows code the received packets and transmit them. Subsequently, any node that receives an coded packet decodes it in order to have the value of the packets from the flows to be stored to replace the corresponding flow packet that has been stored for the longest amount of time. This phase is described in the example in FIG. 13.

Figure 12:
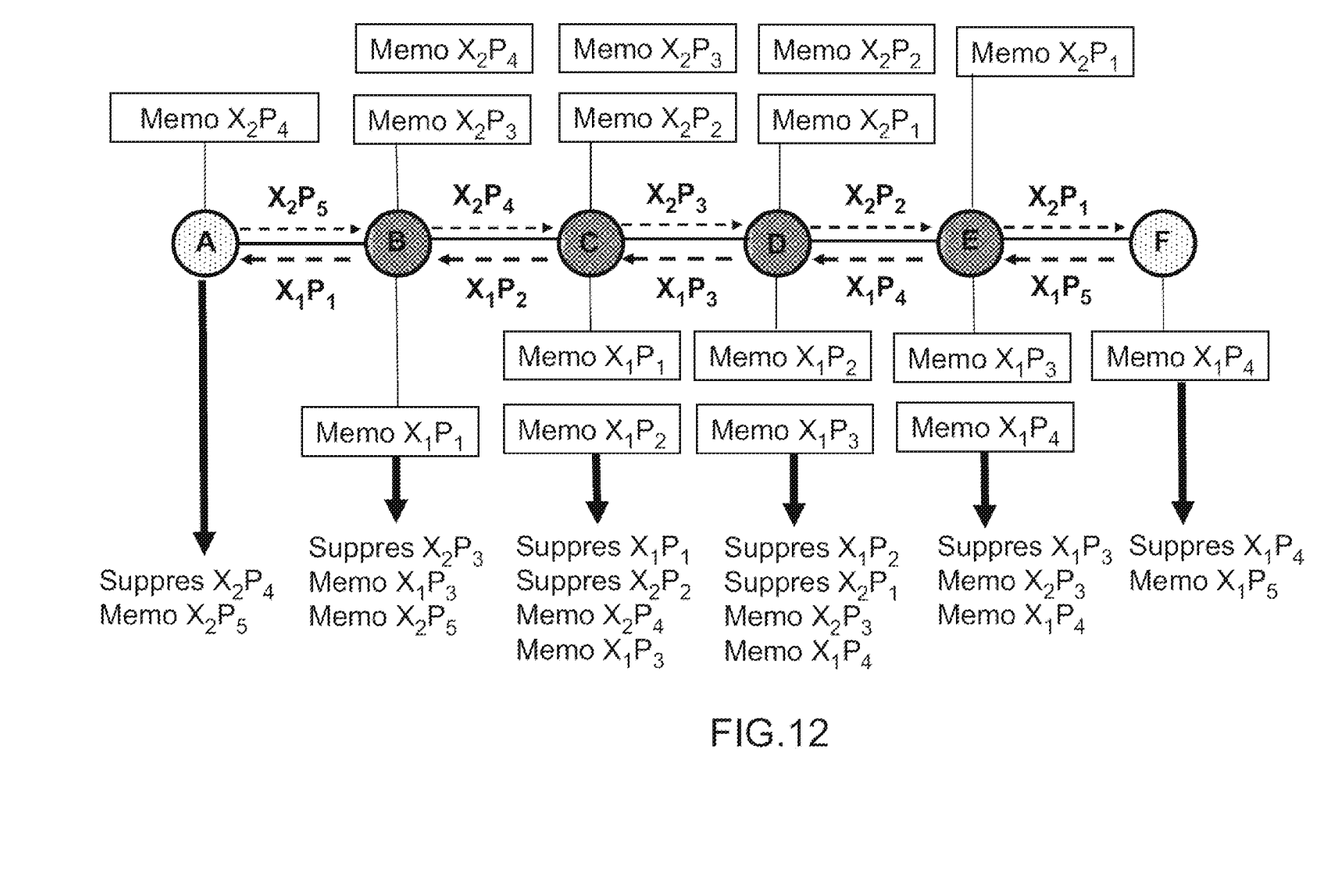
Figure 13:
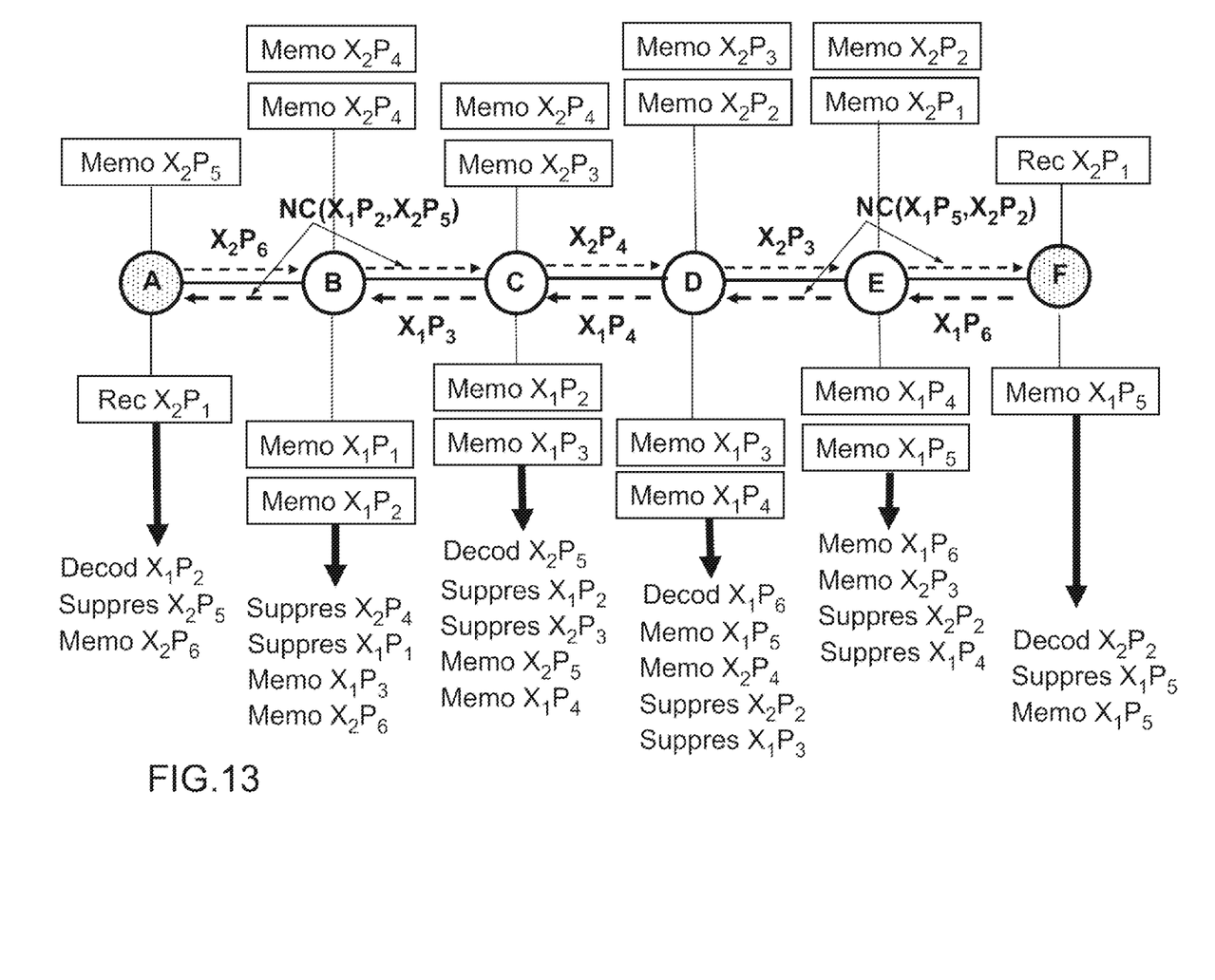
Figure 14:
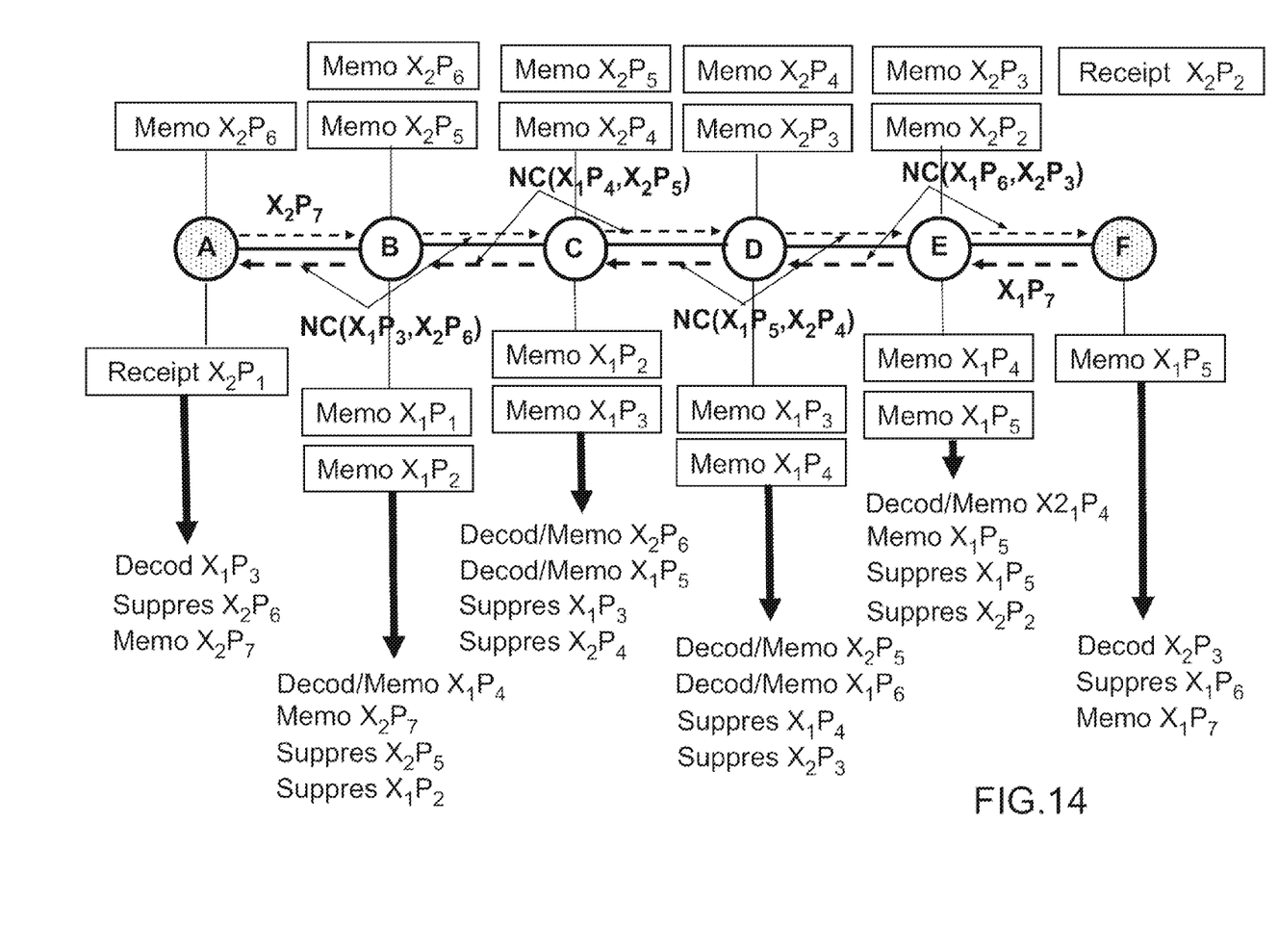

Each of the nodes defined as pivot store the last 2 packets received from the 2 flows. The neighbor nodes of the initial nodes initiate the coding phase. FIGS. 12 and 13 describe the initialization of the procedures of storage of the packets on the nodes and decoding from the nodes that are closest to the initial nodes for the streams. As indicated in FIG. 14, each relay codes and decodes the received packets.

Figure 15:
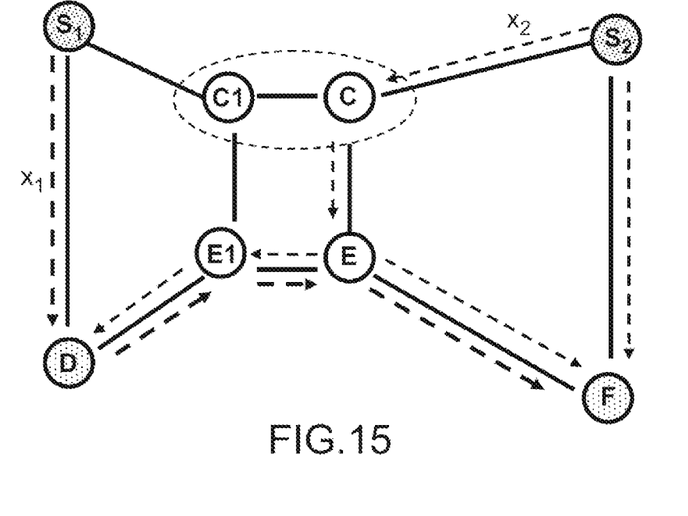
FIG. 15 presents a topology in which 2 paths for network coding optimization are possible.

Determination of Use of Pivot Paths in Multi-Choice Conditions:

FIG. 15 illustrates the capability to choose between several pivot paths. Several alternatives are possible. The first choice is the capability of deterministic choice of one of the two paths (for example based on a comparison order relation for the identifier of the first node, in the case where no other criterion such as the size of the pivot path, or a metric based on Quality of Service parameters, makes it possible to distinguish them.) Another alternative is to take advantage of the opportunity in 2 pivot paths in order to transfer 2 flows (or to divide one flow into two) to fully use the network coding capabilities on the 2 flows.

Extension of the Definition of Origin and Destination Nodes

Figure 16:
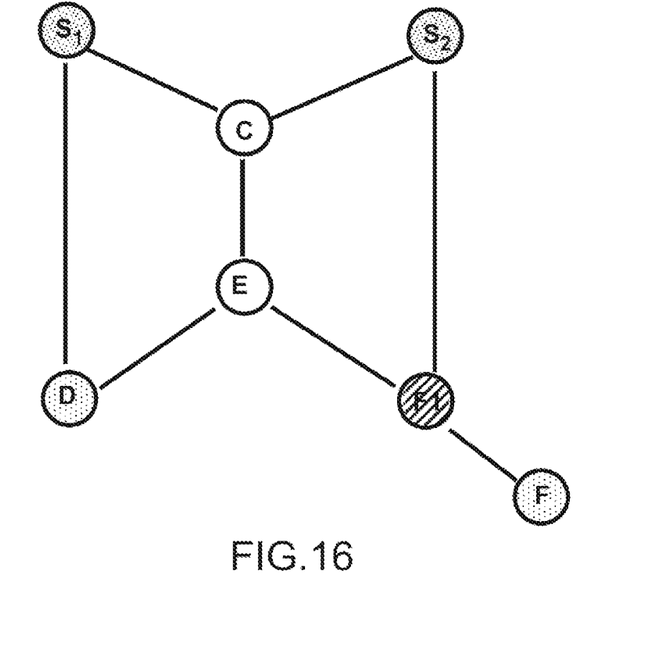
FIG. 16 illustrates the concept of final node by delegation.
Figure 17:
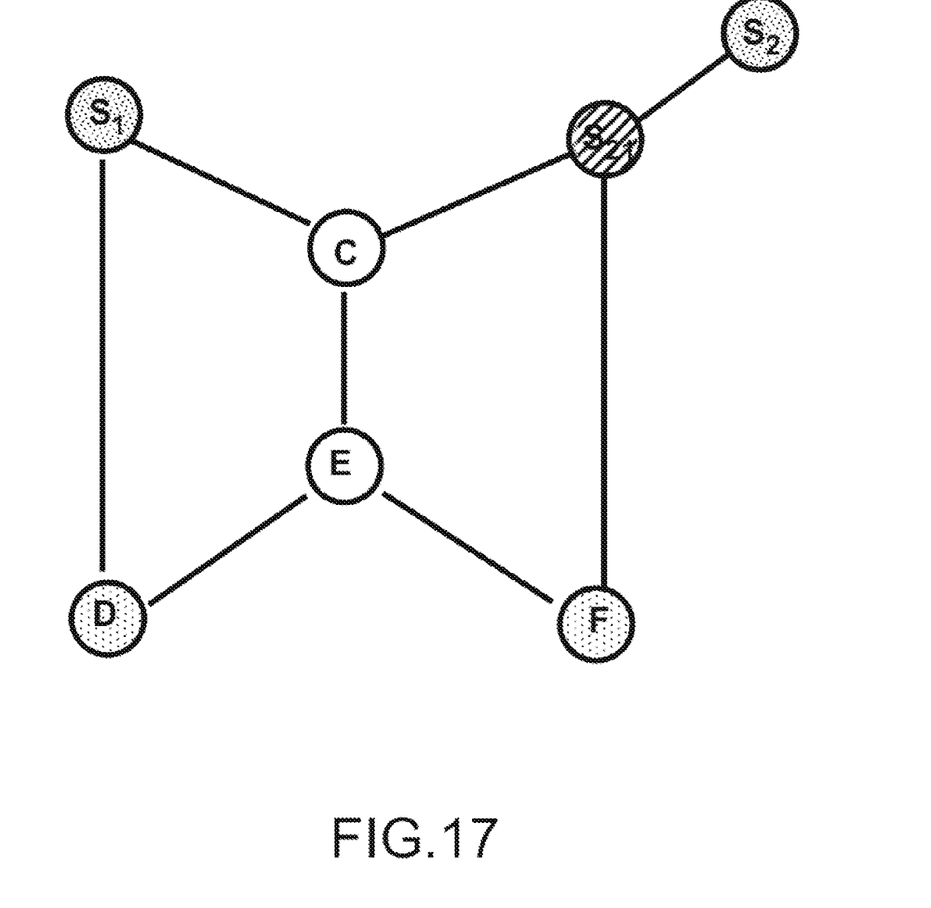
FIG. 17 illustrates the concept of initial node by delegation.

FIGS. 16 and 17 illustrate the extension of the concept of initial and final nodes, as defined initially. These extensions in relation to the initial definition make it possible to extend the topological situations in which the invention can be applied.

Initial Node by Delegation:

FIG. 16 repeats the topology of FIGS. 4 to 8 used to illustrate the invention with the following modification: the initial node $S_2$ for the flow $X_2$ delegates the capability to annotate the list Lft to the node $S_{21}$. The distance to the initial node may be a criterion for choice of these nodes by delegation. This delegation of annotation of the list Lft makes it possible to extend the topologies in which the network coding can be applied.

Destination Node by Delegation:

FIG. 17 repeats the topology in FIGS. 4 to 8 used to illustrate the invention with the following modification: the final node F, which may be the destination for a single flow, delegates to a node F1, from which several flows can transit, the capability to transmit messages by delegation.

Coupling with Resource Allocation Directives:

The protocol proposed by the invention makes it possible to predict the communications of several flows in a given topology, and thus the resource allocation needs in terms of data rate, passband, connectivity to be optimized etc. In addition to the flow path and network coding decisions on certain parts of these paths, the initial node can transmit directives to each of the nodes, so that they optimize their resource allocations.

Extension to Multi-Flow Treatments Other than by Network Coding:

It may occur that the topology does not make it possible to perform network coding, notably in the event of an absence of separate access paths to the destination nodes. Other types of optimization can be applied, for example by concatenating several packets from several flows into one single flow. The proposed protocol makes it possible to determine these situations, which is equivalent to determining the pivot paths.

The method and the network implementing the method according to the invention notably offer the following advantages:
- optimization of data rate by reduction of the number of stream packets sent, without any increase in the data size of these packets,
- the possibility of adapting routing choices depending on the potential for gain through the use of network coding, by identifying topological situations in which the network may be used,
- the taking into account of the modification of flow routes or existing flows to take advantage of network coding when other flows are established,
- the possibility of using network coding in general situations taking into account the asynchronous establishment of flows, and optimizing a reactive-type routing to take advantage of the optimizations, notably in terms of data rate, that network coding provides.

The invention claimed is:

1. A method for optimizing the adaptation of communication routes in a wireless network consisting of communication nodes, said network comprising several source nodes Ni, the transmission of stream data being carried out in the form of flows Xi and between at least two source nodes Ns and at least two destination nodes Nd, comprising at least the following steps:
   step 1, a step of broadcasting a first message M from each source node Si of Ns to all the other nodes Ni of the network, to discover several paths Ci or routes capable of being used,
   on receipt of the message M a node Ni of the network stores, for each of the flows Xi that it receives, the distance NN of the node Ni in relation to each source node Ns or to the preceding node sending said flow Xi, to generate a table Tf for each path traversal Ci initiated by said each source node Ns for each flow Xi coming from its neighbor nodes, the distance to said each source node and the identifier Id of each of said neighbor nodes,
   step 2, each destination node Nd for flows Xi transmits messages to each of the neighbor nodes that are candidates to be a relay for several flows Xi, said messages containing information obtained by making use of the information in the table for storing the information collected in step 1,
   step 3, each of the nodes Ni receiving the flows Xi transmits to the neighbor nodes said information contained in a message Mtopo, said information being transmitted by identifying the paths Ci on which network coding will be able to be applied,
   a node identifies itself as a pivot node if it receives from at least two different neighbor nodes at least two shared flows, list Lf, and if it sends on separate paths, and on receipt of a second message said node transmits to the nodes associated with the flows in Tf a message Mp informing that a node E is a pivot node Np, said pivot node transmitting its identifier ldp to the other nodes using a routing protocol,
   step 4, the identifiers corresponding to the nodes that have identified themselves as pivot nodes are transmitted to the source nodes Ns, which will alert the destination nodes using the routing protocol,
   then the source nodes Ns take the decision to make a change of flows or of streams and to propose to one or more pivot nodes that they use network coding for at least two flows to generate a single flow for the transmission to a destination node.

2. The method as claimed in claim 1, wherein a message Mtopo contains at least the following elements:
   a list Lf of flows;
   a list Lp of lists of flows that can be optimized by network coding;
   a list LBidir of the bidirectional flows from Lp;
   a list FirstCod of the first node to which network coding should be applied;
   a list Nd of lists of destination nodes;
   a list Ln of the nodes traversed, making it possible to code trees with tags indicating the start of a tree and the end of the path of the tree;
   a list Ltf of the flows entirely traversed in paths of the tree Ln;
   collected information making it possible to determine the choice of routes.

3. The method as claimed in claim 2, wherein the collected information has at least the following elements: the path distances Ld; paths Ldp that can be coded by network coding.

4. The method as claimed in claim 3, wherein a source node or initial node S2 for the flow X2 delegates its capability to annotate the list Lft of the flows crossed to another node.

5. The method as claimed in claim 1, wherein the transmission of the information is bidirectional and in that said method has a step involving storage of the transmitted packets for coding and decoding on the relay nodes.

6. The method as claimed in claim 1, wherein the method has phases of storage, coding and decoding of stream packets on a network topology of bidirectional flows between 2 nodes of the network, during the setup of communications with optimization by network coding.

7. The method as claimed in claim 1, wherein a final or destination node F delegates to another node F1, from which several flows can transit, its capability to transmit messages.

8. The method as claimed in claim 1, wherein the method has the possibility of choosing between several pivot paths by using a deterministic choice or by taking advantage of an opportunity in 2 pivot paths in order to transfer two flows.

9. The method as claimed in claim 1, wherein a source node transmits resource allocation optimization directives to each of the nodes in the network.

10. A network architecture to optimize the adaptation of communication routes in a network consisting of wireless communication nodes, said network implementing a routing algorithm, said network comprising several nodes Ni, the transmission of data being carried out between at least two source nodes Ns and at least two destination nodes Nd, said nodes Ns, Nd, Ni having at least one processor coupled to a memory where the memory comprises executable instructions to cause the processor to perform the steps of the method as claimed in claim 1.

* * * * *